Sept. 20, 1949.  L. L. GAGNON  2,482,664
SPECTACLE MOUNTING HAVING TELESCOPICALLY
SECURED BRACE ARMS
Filed July 30, 1945  2 Sheets-Sheet 1
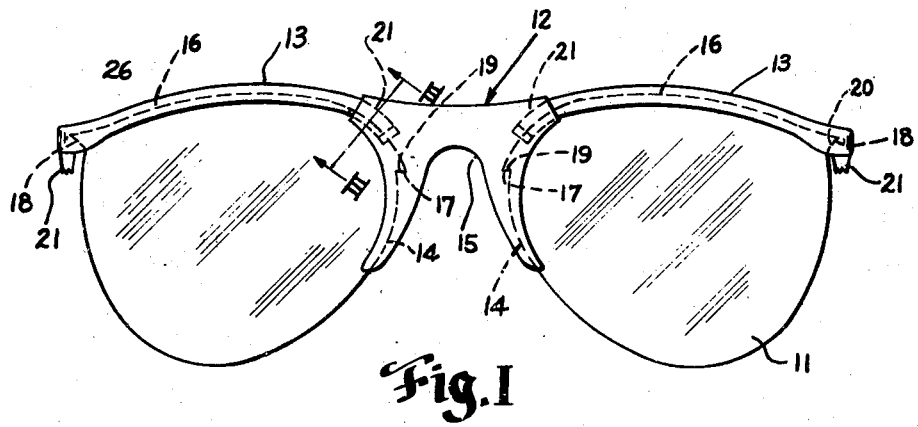
Fig. I
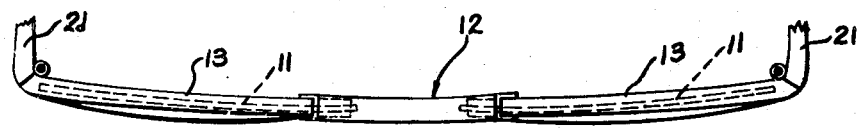
Fig. II
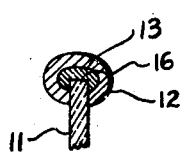
Fig. III
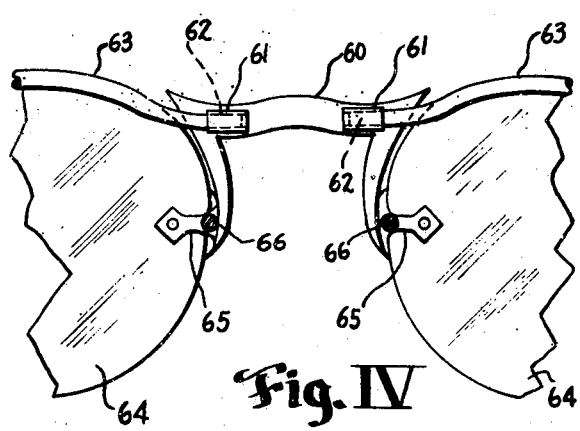
Fig. IV
INVENTOR
Louis L. Gagnon Sept. 20, 1949. L. L. GAGNON 2,482,664
SPECTACLE MOUNTING HAVING TELESCOPICALLY
SECURED BRACE ARMS
Filed July 30, 1945 2 Sheets-Sheet 2
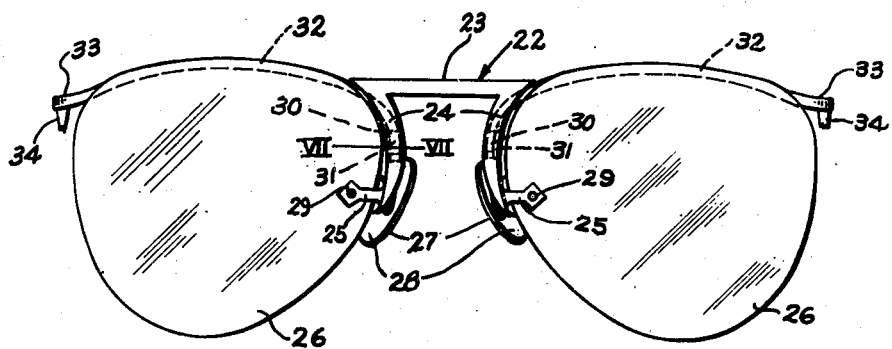
Fig. V
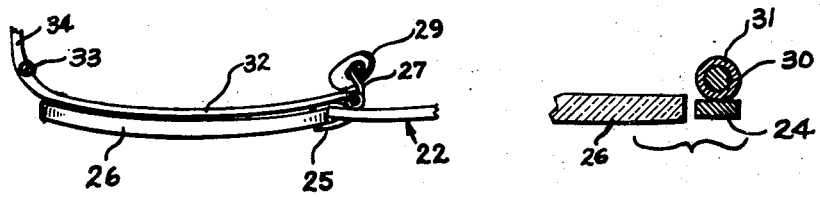
Fig. VI
Fig. VII
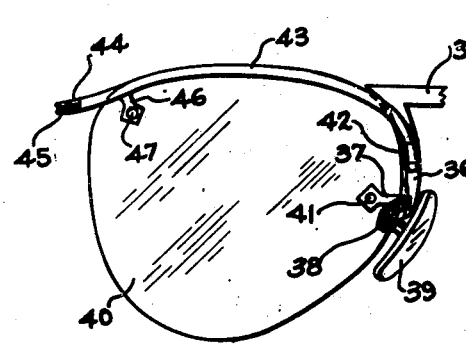
Fig. VIII
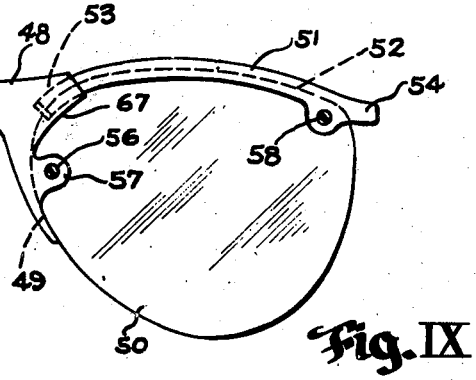
Fig. IX
INVENTOR
Louis L. Gagnon Patented Sept. 20, 1949

2,482,664

UNITED STATES PATENT OFFICE 2,482,664

SPECTACLE MOUNTING HAVING TELESCOPICALLY SECURED BRACE ARMS

Louis L. Gagnon, Southbridge, Mass., assignor to American Optical Company, Southbridge, Mass., a voluntary association of Massachusetts Application July 30, 1945, Serial No. 607,742

2 Claims. (Cl. 88—41)

This invention relates to improvements in ophthalmic mountings and more particularly to improvements in semi-rimless spectacles and improved means of assembling the same.

One of the principal objects of the invention is to provide novel means of forming, assembling and connecting the various parts of an ophthalmic mounting whereby the shape and size requirements of different individuals may be met in a simple and efficient manner.

Another important object of the invention is to provide separable parts for a semi-rimless mounting which may be quickly and easily assembled and secured together according to requirements of different individuals whereby the stock of semi-rimless mountings that it is now necessary for the dispenser to carry, owing to the variations of size requirements, may be greatly reduced.

Another object is to provide semi-rimless spectacle rim members with facile means by which the size variation in wearer requirements may be provided for to fill the particular wearer's needs and the parts may be secured in adjusted relation.

Another object is to provide simple, facile and economical means whereby the single rim members of a semi-rimless type spectacle may be readily fitted to the requirements of different sizes of lenses and secured in said position.

Another object is to provide means by which the number of stock mountings now necessary to be produced by the manufacturer and carried by the dispensers can be greatly reduced, thereby reducing materially the investment now required to produce and stock the said mountings.

Other objects and advantages of the invention will become apparent from the following description taken in conjunction with the accompanying drawings. It will be apparent that many changes in the details of construction and arrangement of parts shown and described may be made without departing from the invention as set forth in the accompanying claims. I, therefore, do not wish to be limited to the exact details and arrangements shown and described as the preferred forms only have been given by way of illustration.

Referring to the drawings:

Fig. I is a front elevational view of a semi-rimless mounting embodying the invention;

Fig. II is a top plan view of Fig. I;

Fig. III is a sectional view taken on line III—III of Fig. I;

Fig. IV is a partial rear view of a modified form of the invention;

Fig. V is a front elevational view of a further modification of the invention showing the lenses supported by straps on the nasal sides thereof;

Fig. VI is a partial top plan view of Fig. V;

Fig. VII is a sectional view taken on line VII—VII of Fig. VI;

Fig. VIII is a partial rear view of a further modification showing the lenses supported on the nasal and temporal sides by lens straps;

Fig. IX is a view generally similar to Fig. I showing a further modification of lens supporting means.

The semi-rimless mountings as now produced by the manufacturer and supplied to the dispenser comprise two rim portions permanently connected together in fixed relation by a bridge portion. This construction is sold and stocked as single units of varying sizes and styles.

There are many different styles and sizes of bridges from which a customer may choose when selecting a mounting. There is also a difference in the distance between the eyes of the different wearers which necessitates the use of different size lenses and rim portions. Therefore, it will be seen that the dispenser will be required to carry a large supply of different combinations to satisfy the needs or desires of the customers as each style and size of bridge will have to be duplicated with the different lengths of rim portions.

It is therefore a principal object of this invention to reduce the number of articles to be made and stocked by the manufacturer and dispenser, while still being able to satisfy any requirement of a customer, and to provide easy and economical means for assembling the separable parts.

Therefore, from the standpoint of economy, ease of production, and prevention of duplication, it is believed that the invention is of great importance.

Referring more particularly to the drawings wherein like characters of reference designate like parts throughout the several views, the device embodying the invention as shown in Figs. I and II, comprises a pair of lenses 11 held in aligned relation with a bridge member 12 by the rim portions 13.

The bridge member 12 is preferably formed of a plastic material such as acetate, nitrate or any other similar material, but may be made of metal if desired. The bridge member 12 is provided with lens grooves 14 in which the lenses 11 are adapted to be seated in aligned relation with each other and has a central portion 15 shaped to fit the nose of the wearer. Various different sizes and styles of bridges may be provided.

The lens rims 13 are shaped to the upper contour shape of the lenses and are adapted to extend from their connection with the bridge member 12 outwardly to the temporal sides of said lenses and are provided with lens receiving grooves 16. Temple connection means are positioned at the outer ends of the lens rims to support the temples 21. The lens grooves in the bridge member 12 and the lens rims 13 are provided with notches 17 and 18 which, when in assembled relation with the lenses, will interlock with the projections 19 and 20 of the lenses to securely hold the lenses in proper adjusted position. If desired, the lenses may be notched and suitable projections provided on the rim and bridge portions.

In assembling the lenses 11 with the bridge member 12, the said lenses are positioned within the groove 14 with the projections 17 of the lenses and the notches 19 in the bridge grooves in interfitting relation with each other, the rim members 13 are then positioned over the lenses with the said lenses seated in the grooves 16. The lens rims 13 are then adapted to be slid inwardly toward the bridge member, with the ends of the rim members 13 extending within the openings 21 of said bridge member. The rim members are slid inwardly an amount sufficient to allow the notches and projections 18 and 20 to interlock as shown in Fig. I. The end of the lens rims extending within the bridge member may then be secured to the said bridge member by any suitable means, such as cement, solder or the like depending upon the material used.

With a structure of this nature, it will be seen that a single length lens rim will be adaptable to fit different size lenses, due to the fact that the end of the rim extending within the bridge, may be cut off to provide the size desired. This will greatly decrease the number of parts which the dispenser will be required to keep in stock to meet the desires of different individuals.

Fig. IV illustrates a similar construction wherein the bridge bar 60 is provided, on the rear thereof, with spaced tubular members 61. The ends 62 of the rim portions 63 are adapted to be positioned within the tubular members and secured therein.

In the above construction, the rim portions 63 lie in the rear of the upper edges of the lenses 64 and are adjusted as to length required according to the size of lens being used by the amount that the end 62 of the rim portion 63 is extended within the tube 61. In this construction, the bridge is secured to the lenses by conventional lens straps 65. Suitable nose pad supporting arms 66 of conventional type are provided in the rear of the bridge and straps 65.

Figs. V, VI and VII show a semi-rimless structure comprising a bridge member 22 having an arch portion 23 and depending legs 24, with lens straps 25 attached to their lower ends to support the lenses 26 in spaced position. Also secured to the lower ends of the bridge legs are the pad arms 27 extending rearwardly and carrying the nose pads 28 at their inner ends. The lenses are adapted to be secured to the lens straps by screws or the like 29 or in any other suitable known manner.

Bearings or sleeves 30 are secured to the rear of the bridge legs 24 and are adapted to receive the ends 31 of the temple supporting members 32 which extend along the upper contour edge of the lenses, in the rear thereof, and terminate in rearwardly extending temple pivotal connections 33. The temple supports may extend along the top edges of the lenses, if desired. The temples 34 are pivotally connected to the members 32 at the connections 33.

The ends 31 of the temple supporting members 32 are adapted to be positioned within the sleeves or bearings 30 and to be secured in adjusted position by means of solder or other suitable means. The temple supporting member may be cut off to vary the length thereof when different smaller size lenses are used.

Fig. VIII shows a further modification of the invention and comprises a lens supporting structure having a bridge member 35 provided with depending legs 36. Lens straps 37, pad supporting arms 38 and pads 39 are secured to the lower end portions of the bridge legs 36. Lenses 40 are held in adjusted relation and secured to the lens supporting structure by means of screws or the like 41 extending through the lens and overlying strap ears.

The bridge member 35 is provided with sleeves or bearings 42 adapted to receive one end of a long and slender temple support 43 which is adapted to extend outwardly from the bridge member 35 along the upper contour edge of the lens 40 and terminate in a rearwardly extending temple pivotal connection means 44. Suitable temples 45 are pivotally connected to the connection means 44.

The long and slender temple supports 43, adjacent the outer or temporal sides thereof, are provided with lens straps 46 adapted to overlie a side surface of the lens 40 and be connected thereto by a screw or the like 47.

With the above structure, it will be seen that a single size of temple support is all that will be necessary to stock, due to the fact that the length of the support may be varied to fit any size lens which is desired by the wearer by cutting off the end which is adapted to be secured within the bearing 42. With this construction, the temple support may be secured, when in adjusted position, to the sleeve or bearing by means of solder or the like.

The modification shown in Fig. IX is of a structure generally similar to that shown in Fig. I and comprises a bridge member 48 of a plastic material, having depending portions 49 fitted to the adjacent contour of the lenses 50. The upper portions 67 are grooved to receive the adjacent portions of the lenses. The lens rims 51 are adapted to extend from the bridge 48 outwardly to the temporal sides of the lenses and to follow the contour edge thereof, with suitable lens receiving grooves or seats 52 therein. The nasal ends of the lens rims 51 are adapted to be inserted in a suitable opening 53 of the bridge 48 and to be secured therein by means of cement or the like. The outer or temporal ends 54 of the lens rims 51 are provided with pivotal connection means to which suitable temples may be attached.

In this construction, the lenses 50 are held in adjusted position by means of screws or the like 56, extending through the lens connecting ears 57 and 58 of the bridge and lens rim respectively. The said lens connecting ears 57 and 58 may be formed to overlie one or both sides of the lenses as desired. By connecting the lenses to the supporting structure in this manner, it will eliminate the necessity of forming the lenses with projections, as shown in Fig. I.

In mountings of the character described it is particularly desirable that the temple supporting ends to which the temples are pivotally connected must be located at a given distance above the horizontal center lines of the lenses so that when the rim portions, which are shaped to follow substantially the upper contour edges of the lenses, are in assembled relation with said lenses the said temples will be positioned at a desired height above said horizontal center lines and will extend rearwardly of said lenses along a line which will intersect the plane of the lenses adjacent the upper contour sides thereof.

With lenses of different sizes, according to the present invention, it is essential, therefore, that the length of the temple supporting arm or rim portion be initially adjusted so that the parts will assume the above desired relation with the lenses prior to permanently connecting the arms with the adjoining parts of the mounting. With the above disclosed arrangements, this result may be accomplished with a single length arm, which arm is initially formed of a length suitable for use with the largest size lens desired. Lenses of a smaller size will require a portion of the nasal end of the arm to be removed during the initial fitting.

It is also to be understood that further adjustments of the arms or rim portions may be required to insure that they properly follow the upper contour shape of the lenses.

One of the essential features, therefore, of the present invention is that means are provided for controlling the distance between the bridge and the temporal ends of the arms so that the said arms will be properly related with lenses of different sizes and shapes and further to insure that the temple supporting ends of the arms will be located in proper relation with the lenses and at the desired distance above the horizontal center lines of the lenses.

From the foregoing description, it will be seen that applicant has provided simple, efficient and economical means and methods of accomplishing all the objects and advantages of the invention, particularly that of providing separable parts of a semi-rimless mounting which may be quickly, easily and adjustably secured together in a manner which will greatly decrease the number of parts required to be stocked and which will meet the various requirements of the different individuals.

Having described my invention, I claim:

1. In an ophthalmic mounting, a lens supporting structure for use with lenses having interconnecting means adjacent the opposed sides thereof, said structure comprising a bridge member and a pair of bar-like members each being shaped substantially to follow the upper contour shape of said lenses, said bridge member having lens interconnecting means on the opposed sides thereof and said bar-like members each having temple supporting means adjacent their outer ends and each having lens interconnecting means adjacent said temple supporting means, said bridge member and the inner ends of said bar-like members having interfitting portions, with one of said interfitting portions being recessed and the other being shaped to extend within said recessed portion and being adjustable longitudinally thereof to alter the distance between the respective lens interconnecting means of said bridge member and of said bar-like members whereby said lens interconnecting means may be moved into cooperative relation with the interconnecting means of the respective lenses and simultaneously position said interfitting portions for connection with each other by securing means to retain said supporting structure and lenses in assembled relation with each other.

2. An ophthalmic mounting comprising a pair of lenses having interconnection means disposed on the nasal and temporal sides thereof, and a bridge member intermediate said lenses, said bridge member having depending side portions shaped to follow the nasal contour of said lenses, said depending side portions having lens interconnection means interfitted with the interconnection means on the nasal side of the lenses, apertured means adjacent the upper portion of said depending side portions, and bar-like members each having one end telescopically secured within said apertured means and each having their opposed ends terminating in temple hinge means, said depending side portions of the bridge member each having channels formed on their lens edge side in which the adjacent edges of said lenses are seated, and interconnection means carried by the bar-like members adjacent the temporal ends thereof, said interconnection means being interfitted with the interconnection means on the temporal sides of the lenses so as to support the lenses in assembled relation with the mounting.

LOUIS L. GAGNON.

REFERENCES CITED

The following references are of record in the file of this patent:

UNITED STATES PATENTS

| Number | Name | Date |
|---|---|---|
| 85,495 | Want et al. | Dec. 29, 1868 |
| 926,293 | Savoie | June 29, 1909 |
| 2,257,812 | Pomeranz | Oct. 7, 1941 |
| 2,355,053 | Carlson | Aug. 8, 1944 |
| 2,357,267 | Rohrbach | Aug. 29, 1944 |
| 2,366,659 | Uhlemann et al. | Jan. 2, 1945 |
| 2,372,059 | Cook | Mar. 20, 1945 |
| 2,383,572 | Splaine et al. | Aug. 28, 1945 |
| 2,388,191 | Splaine | Oct. 30, 1945 |
| 2,398,137 | Dunham | Apr. 9, 1946 |